United States Patent

Albanello et al.

[11] Patent Number: 6,119,950
[45] Date of Patent: Sep. 19, 2000

[54] THERMOSTAT WITH LOAD RELAY CYCLING FEATURE

[76] Inventors: Frank A. Albanello, 7406 Cheshire La., St. Louis, Mo. 63123; Bartholomew L. Toth, 9334 Ewers Dr., St. Louis, Mo. 63126; Scott J. Brunk, 8308 W. 150th St., Overland Park, Kans. 66223; Carl J. Mueller, 3143 Piney Pointe, St. Louis, Mo. 63129; David L. Perry, 4840 Placid Hills, Arnold, Mo. 63010

[21] Appl. No.: 09/138,473

[22] Filed: Aug. 21, 1998

[51] Int. Cl.[7] .............................. F23N 5/20; G05D 23/00
[52] U.S. Cl. ........................................ 236/46 R; 165/267
[58] Field of Search .............................. 236/46 R, 1 EA; 165/267

[56] References Cited

U.S. PATENT DOCUMENTS

| | | | |
|---|---|---|---|
| 3,933,197 | 1/1976 | Zimmer et al. | 236/46 R |
| 4,081,691 | 3/1978 | Evalds et al. | 236/1 EA |
| 4,612,776 | 9/1986 | Alsenz | 236/1 EA |
| 4,898,229 | 2/1990 | Brown et al. | 236/94 |
| 5,127,464 | 7/1992 | Butler et al. | 236/46 R |
| 5,743,100 | 4/1998 | Welguisz et al. | 62/158 |

*Primary Examiner*—William Wayner

[57] ABSTRACT

A thermostat for an environmental control load that includes a temperature sensor, a timer, and a controller, and a method of controlling the thermostat that allows temporary system outages including, but not limited to, outages caused by lockouts or failure of pulsed relays to operate, to be corrected automatically, by the thermostat itself. The environmental control load may include a heating system such as a heat pump or a millivolt heating system, although the thermostat and its method of operation could also be employed with cooling systems, or heating and cooling systems. The controlled load may be one that has a "lockout" mode to prevent activation when a problem is detected, such as a reduction in gas pressure. The temperature sensor detects whether, for example, a request for heat issued by the controller has been satisfied, or alternately, if the ambient temperature has risen within some period of time, usually about two hours. If the ambient temperature has not satisfied this condition within two hours, the environmental control load is turned off, and then on, to recycle and overcome the lockout condition, if the load is resettable and the condition causing the lockout has passed. This resetting may occur only once, or may be repeated after another period of time, with the repetitions optionally being limited in number. The thermostat can safely be used without noticeable degradation in service even with nonrecyclable systems.

24 Claims, 2 Drawing Sheets

THERMOSTAT WITH LOAD RELAY CYCLING FEATURE

BACKGROUND OF THE INVENTION

1. Field of the Invention

This invention relates to a thermostat with a load relay cycling feature, and to a method of controlling an HVAC system utilizing load relay cycling.

2. Description of the Prior Art

Thermostats used for controlling HVAC systems typically control pulsed latching relays in the HVAC systems to operate heating loads and cooling loads. Thermostats in systems using such relays cannot confirm whether the heating unit or the cooling unit, as the case may be, has actually responded when an attempt is made to activate the unit. Without the ability to confirm activation of the load, prior art thermostats are unable either to make repeated attempts to activate the heating or cooling unit, or to signal an actual failure of control. Failure of control will result in heating or cooling not actually being performed when needed, or heating or cooling continuing when it is not wanted. Aside from being wasteful in the latter case, failure of control may result in the environmental temperature becoming uncomfortable.

Also, in some heating systems, even though there is no fault in the controlling thermostat, a lockout condition can occur because an ignition controller (for example) may have detected a momentary or transient problem. Such momentary problems may include, in a gas heating system, a drop in the available gas pressure such that the ignition system cannot ignite the furnace. Other conditions may also be detected that could cause a lockout in gas or other types of systems, including heat pump systems. Various temperature control units (typically, gas heating systems and heat pumps) detect potentially troublesome or, perhaps, hazardous conditions and enter into a lockout mode to prevent the unit from being operated by the thermostat.

Although lockout conditions are generally temporary, not all furnaces or heating systems are provided with means for automatically restoring thermostat control when the condition causing the lockout has passed. For example, in the case of a momentary gas pressure drop, a conventional thermostat may remain "locked out" so as not to be able to reactivate the furnace, even though heating may be required. Moreover, a conventional thermostat also has no means for detecting, signaling, and/or correcting this condition.

BRIEF DESCRIPTION OF THE INVENTION

It would therefore be desirable to provide a thermostat that is capable of testing and determining whether a thermal load has been activated.

It would further be advantageous to provide a thermostat that can test and reactivate a thermal load when a request for activation of the thermal load has gone unfulfilled.

It would also be advantageous to provide a thermostat having means for testing for and correcting or compensating for certain momentary or transient heating system problems.

It would also be desirable to provide a thermostat having means for testing, correcting, and compensating for certain momentary or transient problems occurring in heat pump systems.

It would also be desirable to provide a thermostat having means for testing, correcting, and compensating for certain momentary or transient problems occurring in millivolt heating systems.

It would also be desirable to provide a thermostat having means for allowing heating to resume when a "lockout" condition occurs in a heating system as a result of a temporary reduction of gas pressure.

There is thus provided, in accordance with the invention, a thermostat for an environmental temperature control system that includes a controller having a load controlling output and a temperature sensing input; a temperature sensor coupled to the temperature sensing input of the controller; and a timer having an expiration period and which is responsive to the controller for resetting when the controller signals a request for heat at the load control output; wherein the controller is responsive to the timer and the temperature sensor so that, after the controller issues a first request for heat at the load control output and the timer expires before satisfaction of the first request for heat, the controller issues a second request for heat at the load control output. (The request for heat is issued as an electrical signal at the load control output.)

In accordance with additional, preferred features of the invention, the timer may be programmed with a predetermined expiration period (for example, about two hours). The timer may, alternatively, be programmed with a variable expiration period, if such is deemed appropriate to the type of system that is to be controlled. The timer may further be reset upon the issuance of the second request for heat, so that a third request for heat may be issued if the timer expires again.

In accordance with another aspect of the invention, there is provided a thermostat for an environmental temperature control system comprising a temperature sensor, a timer, and a controller responsive to the temperature sensor and the timer for cycling a temperature control load at an interval set by the timer when a request for heat issued by the controller is not satisfied during the interval. In accordance with additional, preferred features of the invention, the controller may be responsive to the temperature sensor and the timer for cycling a temperature control load multiple times, each cycle taking place at an interval set by the timer, during a period in which the request for heat is not satisfied. The thermostat may also comprise means for cycling a millivolt heating system, or for cycling a heat pump system. (Of course, both means may be provided for flexibility.) Moreover, the controller may be responsive to the timer and the temperature sensor to recycle the temperature control load when an ambient temperature has not reached a set point within two hours after a call for heat by the controller.

There is also provided, in accordance with yet another aspect of the invention, a thermostat and a method of operating an environmental temperature control system including a temperature control load having a lockout mode, in which the method comprises transmitting a first transient signal from a thermostat to operate the temperature control load to satisfy a thermostat setting; and when the thermostat setting has not been satisfied after a period of time from the transmission of the first transient signal, transmitting a second transient signal from the thermostat to operate the temperature control load. Preferably, the transmission of a second transient signal includes the transmission of a signal to recycle the temperature control load off and then on. The temperature control load being controlled may be a millivolt heating system, or a heat pump, and the period of time is preferably about two hours. The step of transmitting a second signal may be repeated, with each repetition being separated by a predetermined period of time, such as two hours, until the thermostat setting has been satisfied. Alternately, the repetition may occur until a maximum repetition count is reached, at which point further automatic recycling is inhibited until the thermostat is manually recycled.

It is thus an object of the invention to provide a thermostat that is capable of testing and determining whether a thermal load has been activated.

It is a further object of the invention to provide a thermostat that can test and reactivate a thermal load when a request for activation of the thermal load has gone unfulfilled.

It is yet another object of the invention to provide a thermostat having means for testing for and correcting or compensating for certain momentary or transient heating system problems. Such correction and compensation could include the recycling of, and reactivation of the system when a problem is determined to exist, such as when a temperature setting is not satisfied within a certain period of time.

It is another object of the invention to provide a thermostat having means for testing, correcting, and compensating for certain momentary or transient problems occurring in heat pump systems.

It is yet another object of the invention to provide a thermostat having means for testing, correcting, and compensating for certain momentary or transient problems occurring in millivolt heating systems.

It is still another object of the invention to provide a thermostat having means for allowing heating to resume when a "lockout" condition occurs in a heating system as a result of a temporary reduction of gas pressure.

The manner of achieving these and other objects of the invention will become apparent to one skilled in the art upon referring to the detailed explanation below in conjunction with the accompanying figures. It will also be recognized that inventive embodiments within the scope and spirit of the invention achieving some, but not all of the objectives and advantages of the invention are possible.

DETAILED DESCRIPTION OF THE PREFERRED EMBODIMENTS

In the description and claims set forth herein, the term "environmental temperature control system" can refer to an HVAC system or unit, or a system or unit for cooling or for heating only. A "temperature load" is used to refer to a device such as a gas valve, a compressor contactor, or a relay controlling an electric heater, or to any other device or apparatus controlled by the thermostat for effecting a temperature change or to a selected one of a combination of such devices present in an HVAC system, insofar as such devices in a system are controlled by the thermostat. Also, where a device, circuit, or input is said to be responsive to a particular signal, whether a voltage signal or a current signal, unless otherwise noted, it is understood that one skilled in the art would understand that such signals may, as a design choice, be transformed or conditioned, or other equivalent signals generated that operate and are used as a functional equivalent to the particular signal named. The use of such transformed, conditioned, or equivalent signals should be understood as being within the scope and spirit of the invention and also be considered, where applicable and appropriate, as falling within the scope of the claims.

Figure 1:
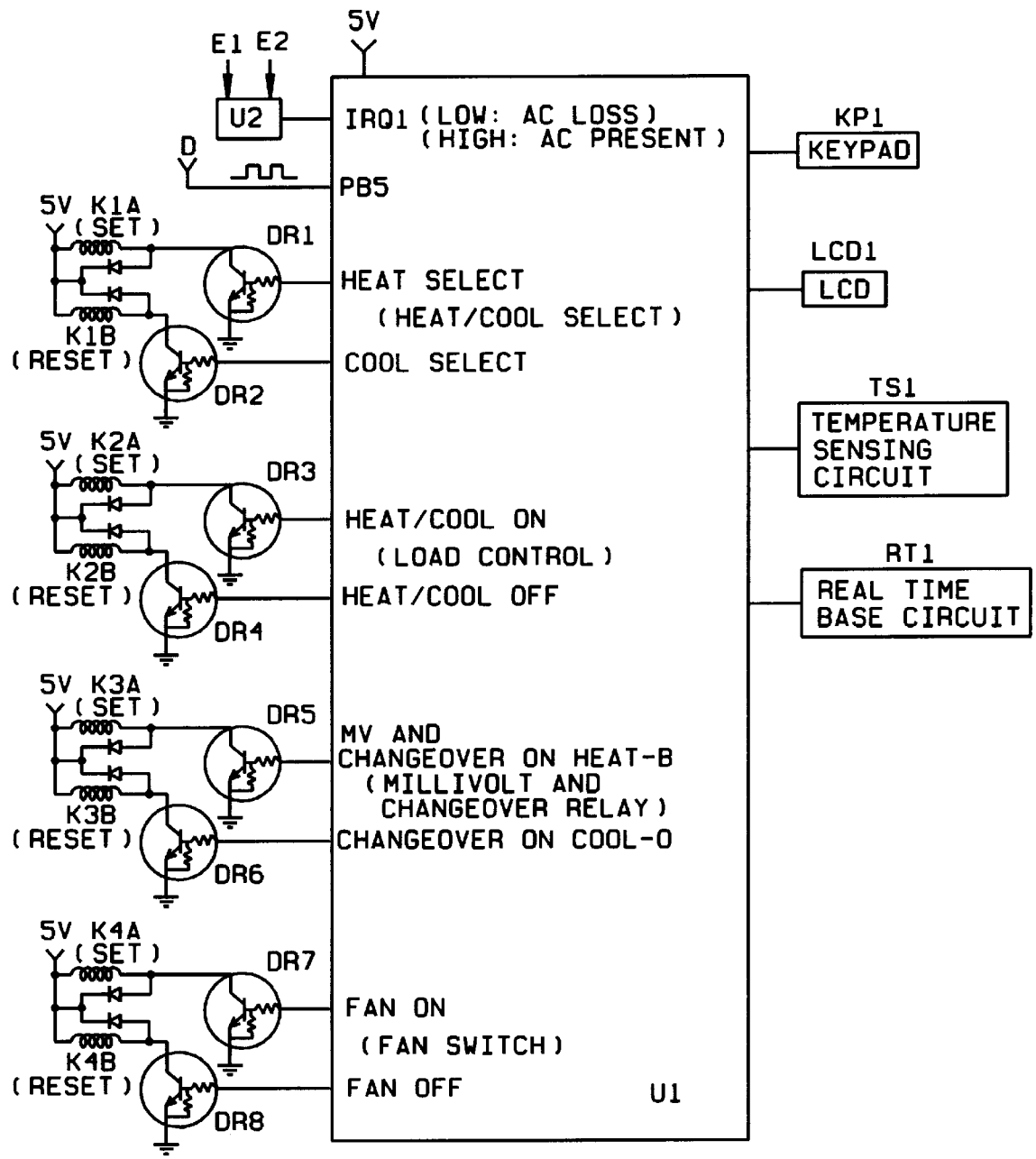
FIG. 1 is a simplified block diagram of an embodiment of a processor unit of a thermostat in accordance with the present invention.

FIG. 1 is a block diagram of an embodiment of a processor unit of a thermostat in accordance with the present invention. Controller U1 is preferably a conventional microcontroller with memory, which may itself comprise one or more chips. Controller U1 is provided with conventional thermostat peripherals, including a keypad KP1 for the input of commands, an LCD display LCD1 for displaying the current status of the thermostat, a temperature sensing circuit TS1, and a real time base circuit or real-time clock RT1. Controller U1 is also provided with a power supply (not shown), which may be derived from the environmental temperature control system power supply, or independently therefrom. The thermostat could be battery-powered, or it may use a battery as a back-up power source. A back-up power source would be desirable to keep the real-time clock RT1 running during a power outage.

Controller U1 provides outputs for heat select (HS), cool select (CS), heat/cool on (HCON), heat/cool off (HCOFF), millivolt and changeover relay on heat-B (COH), changeover on cool-O (COC), fan on (FON), and fan off (FOFF). These operate driver amplifiers DR1–DR8, respectively, which, in turn, control relay coils of the environmental temperature control system. These relay coils are: K1A (set), K1B (reset), K2A (set), K2B (reset), K3A (set), K3B (reset), K4A (set) and K4B (reset). A "set" coil may control several latching relay contacts and is typically energized by a DC pulse lasting approximately 7 milliseconds. Thus, if "heat" mode is selected by controller U1, relay coil K1A is energized for 7 milliseconds. If "cool" mode is selected, relay coil K1B is energized, instead. Actual requests for heat (such as to satisfy a thermostat setting when the temperature, as sensed by the temperature sensing circuit TS1, falls below the thermostat setting) is accomplished by energizing relay coil K2A and relay coil K3A, while requests for cooling are made by energizing relay coil K2A and K3B. (Typically, the K3A and K3B relay coils control a reversing valve in a heat pump.) The fan is controlled by energizing relay coils K4A (to turn the fan on) or by energizing relay coil K4B (to turn the fan off.)

It will be understood that the invention does not require that the thermostat be adapted to control environmental temperature control systems having both heating and cooling capabilities. In fact, it is contemplated that the most common application of the invention will relate to heating systems, or to the heating portion of combination heating and cooling systems. It is not required, for practice of the invention, that the thermostat perform both heating and cooling functions or that have all of the outputs or inputs shown in FIG. 1. (A multipurpose thermostat or a replacement thermostat may have all of the illustrated inputs and outputs, as well as others not related to the practice of the invention.) Those inputs and outputs that are provided in any specific embodiment may be adapted for compatibility with different electrical switching requirements, as would be understood by those skilled in the art.

Operation of the thermostat shown in FIG. 1 is, in part, conventional, in that activations of temperature loads (such as, by way of example, a fan, a gas valve, and a compressor contactor) are controlled by DC current pulses supplied to relay coils K1A, K1B, K2A, K2B, K3A, K3B, K4A, and K4B in accordance with a sensed temperature and a controller setting. In some cases, the temperature load may not be activated when the relay coils are pulsed. The invention is directed to a thermostat that can automatically detect and correct such conditions and reactivate the load. However, some heating and cooling systems have a "lockout" mode that prevents activation even though the relays controlled by the thermostat are pulsed. The invention is also directed, in part, to the handling of this potential problem.

A lockout mode may be entered when an ignition controller for a gas furnace detects a momentary problem, such as a drop in gas pressure in the gas line that may prevent the furnace from igniting. Circuitry in the furnace (or other system susceptible to lockout) prevents an activation attempt made by the thermostat from being carried out during a lockout. In some cases, systems susceptible to lockout may be automatically reset, allowing heating (or cooling) to proceed normally after the cause of the lockout has terminated. In other cases, the system has to be cycled to become activated. The thermostat of this invention provides a cycling feature to handle these cases.

Figure 2:
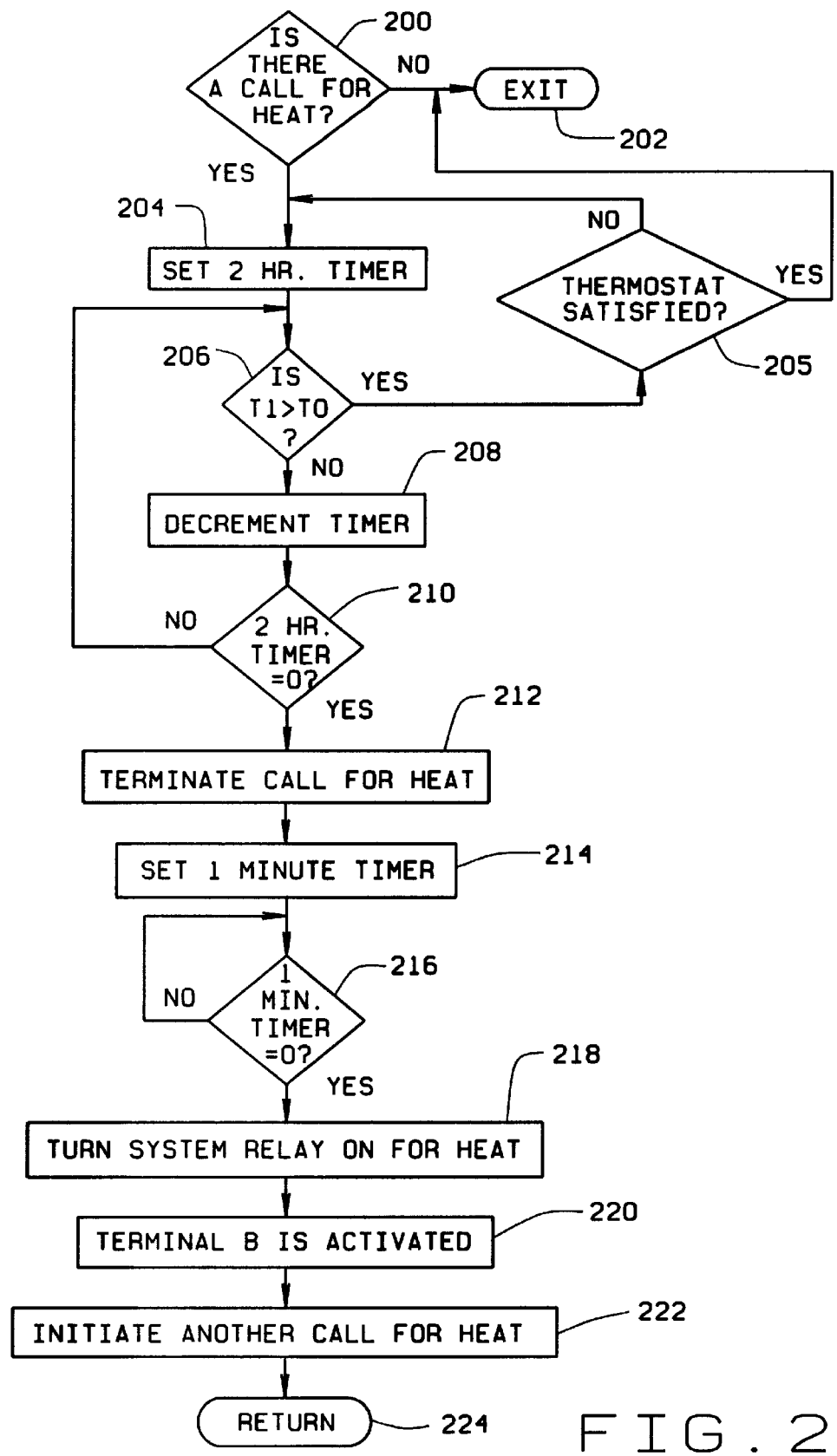
FIG. 2 is a simplified flow chart showing, in conjunction with the description below, a procedure for operating the processor unit of FIG. 1 in accordance with the present invention.

FIG. 2 is a flow chart of an embodiment of the method of the invention by which a thermostat can automatically detect and correct for conditions in which the temperature load has not been properly activated, and also clear lockouts, if that is necessary. This flow chart assumes that only the heating system is checked for operation and that only the heating system is recycled in the event of an activation failure or a heating lockout, although in view of this description, the extension to cooling systems would be apparent to those of ordinary skill in the art. More particularly, if a call for cooling rather than heating is outstanding, decision block 206 would check for a drop in temperature rather than an increase, and cycling, if necessary, would be performed on the cooling system rather than on the heating system.

At block 200, the procedure checks to determine whether there is an outstanding call for heat. If not, there is nothing to do, so the procedure exits at block 202. Otherwise, a timer (for example, a two hour timer) is set at block 204. Then, a check is made in decision block 206 to see whether the new measured temperature is greater than the previous measured temperature. (In one embodiment, temperature is measured in increments of $\frac{1}{16}$ degree Fahrenheit. The selection of this increment is not critical, but can be chosen to allow accurate temperature measurement while providing some resistance to thermal and/or electrical noise.) If it is, a check is made at block 205 to determine whether the thermostat has been satisfied. If it has been satisfied (i.e., if T1 is equal to or greater than the set point temperature, plus or minus any allowance for hysteresis that may be built into the system), the routine exits, to be entered again when there is another call for heat (such as when the set point is increased, or the temperature drops below the setpoint value, plus or minus allowance for hysteresis). Otherwise, the two hour timer is set again at 204. One skilled in the art should understand that the temperature reading at block 206 may be taken at intervals as long as one minute or longer, or at shorter times, such as 2 to 10 seconds or even shorter, this selection being a design choice that may be based on other considerations such as avoidance of temperature overshoot or undershoot. Of course, if the temperature has risen, the new, higher temperature will be taken as the value of T0 to which a new measured temperature will be compared, at the next time block 206 is entered.

If the temperature has not risen, T0 is set to the lower of the current temperature and the present value of T0, and the two hour timer is decremented at block 208 and tested at block 210 to determine whether it has expired. If it has not expired, decision block 206 is entered again for another temperature comparison. If the timer has expired, the call for heat is terminated at block 212. In one embodiment, the termination of the call for heat is accomplished by pulsing load relay coil K2B for a normal pulse width of 7–9 milliseconds. Next, a one minute timer is set at block 214. At block 216, a loop is entered to wait until the one minute timer has expired to ensure that the system has been turned off or is already off. After the one minute timer has expired, the system relay is turned on for heat at block 218 by pulsing relay coil K1A to select heat, using a "double" pulse width of 14 milliseconds. (A doubled pulse width is provided for additional assurance that the system is turned on, if it can be turned on.) Terminal "B" is activated by pulsing K3A at block 220 using a double pulse width of 14 milliseconds. This assures that, regardless of whether a heat pump or a millivolt heating system is controlled by the thermostat, it will be activated for heating, if it is possible to do so. At block 222, another call for heat is initiated by pulsing relay coil K2A with a normal pulse width of 7 milliseconds. The routine returns at block 224.

Usually, one call of this routine will be sufficient to recover from a lockout condition, so the main control procedure would call this procedure only once, with the possibility of calling it again only after the thermostat setting is satisfied either in this routine at block 205, or, if necessary, sometime after a return from block 224. However, it is possible to repeat the routine directly after a return from block 224 (indicating that a cycling of heat was required) by directly looping back to block 200 one or more times. Generally, if a thermostat setting cannot be satisfied before block 224 is reached three times, it may be better to exit the routine the third time block 224 is reached, because the lockout condition in such a case may possibly be a condition that requires manual servicing.

It will be understood that the components (such as read-only and read/write memory) that may be required to implement the procedure of FIG. 2 may be provided as part of the controller U1, and are preferably (but not necessarily) integral to the controller. For this reason, they are not explicitly shown separately from controller U1 in FIG. 2.

The flow chart of FIG. 2 assumes that a lockout has occurred in a heating system. It should be recognized, however, that lockouts in the cooling system could be handled in a similar fashion. However, unlike heating units, cooling units are often undersized in the sense that installed units are selected to ensure that the cooling unit runs for a sufficient length of time to reduce ambient humidity as well as temperature. As a result, recycling may be indicated more often than is actually necessary or useful. In addition, some of the reasons that lockout may occur in a cooling system may not be remedied in a manner such that recycling can provide effective operation. Notwithstanding these differences, recycling a cooling system may still be useful if a lockout is the result of a transient condition.

It will also be recognized that the inventive thermostat will operate advantageously with heating and cooling loads that do not have a lockout function. Whether such loads have a lockout function or not, the temperature detection feature at block 206 (illustrated in FIG. 2 for a heating load) provides a test to determine whether the load has been properly activated by checking whether the ambient temperature has changed in a direction consistent with a request made by the thermostat, i.e., an increase if a heating request was made, or a decrease if a cooling request was made. If the temperature has not changed in the expected direction after a period of time (2 hours in the embodiment of FIG. 2), it can be assumed that the load has not been properly activated. In such a case, the thermostat reactivates the load. While the two hour wait in FIG. 2 is satisfactory for systems with lockouts, delay times and the number of reset attempts may be changed, if desired or if necessary, for systems known not to be subject to lockout or for undersized cooling and/or heating loads.

It will thus be seen that the present invention provides a device and method for operating a temperature load in an environmental temperature control system in such a manner as to automatically recover from many transient conditions in which the temperature load is non-responsive or locked out. This control is accomplished in a thermostat by a circuit that detects changes in temperature over time, and if an appropriate change in temperature is not detected within a predetermined period (or at least a period in which a temperature change would be expected to occur, which need not necessarily be determined in advance), the temperature control load is recycled by turning it off momentarily, and then back on. This process may occur only once, or it may repeat one or more times, usually (but not necessarily) up to some limit. The limit to the number of times the process is repeated may be set in view of safety requirements, insofar as it may not be desirable to continue to recycle a temperature load beyond a point at which it has become clear that the cause of the nonresponsiveness and/or lockout of the temperature load is a nontransient problem.

In addition, it will be recognized that the inventive thermostat and methods disclosed herein may be used with many general types of temperature control loads, because the inventive devices and methods used to recover from lockout will not noticeably interfere with the operation of units that do not have the lockout feature, or that cannot recover from a lockout by recycling. For units that do not have the lockout feature, cycling would merely cause a brief interruption in the operation of the temperature load at widely spaced intervals, should the temperature test fail to be satisfied. For units that cannot recover from lockout by recycling, recycling of such units will have no effect. Limiting the total number of recycle attempts upon failure of the temperature test (e.g., by providing a counter in memory that allows only a certain number of recycling attempts if a given thermostat setting is not satisfied before the thermostat itself is recycled or the temperature setting is changed) will limit the total number of interruptions that may occur with units that do not have a lockout feature, and will avoid excessive numbers of retries on units that do not allow reset by recycling.

It will be understood by those of ordinary skill in the art that many modifications of the embodiment of the invention disclosed are possible without departing from the spirit of the invention. By way of example only, and separately from or in addition to any of the modifications discussed above, such modifications may include setting the timer to some period other than two hours, or setting it to varying times, possibly depending upon the type of load being controlled or the number of times the reset procedure has occurred in some time interval; testing for a the thermostat reading being satisfied in block 206 rather than merely that the temperature has risen since the last test; changing the timing interval at block 214 and 216; changing the lengths of the pulses to the relay coils, or the number of pulses that are sent, possibly for reliability purposes; and/or applying the procedure to a cooling system or a heating and cooling system. Of course, to apply the procedure to a cooling system, the test at block 206 should be to determine whether the present temperature is less than (rather than greater than) the previously measured temperature. In addition, the circuit of FIG. 1 may be modified as necessary to provide effective control of the environmental temperature control system in accordance with the inventive procedure of FIG. 2.

Because of the wide scope of modifications possible to the embodiment of the invention described herein without departing from the scope and spirit of the invention, the scope of the invention is not limited to the embodiment described herein, and should instead be determined with reference to the claims below and such equivalents as are provided under applicable law.

What is claimed is:

1. A thermostat for an environmental temperature control system having one or more temperature loads for controlling temperature in an environment, said thermostat comprising:

a) a controller having a load controlling output and a temperature sensing input;

b) a temperature sensor coupled to the temperature sensing input of the controller; and c) a timer having an expiration period and which is responsive to the controller for resetting when the controller signals a request for a temperature change at the load control output;

the controller being responsive to the timer and the temperature sensor so that, after the controller issues a first request for a temperature change at the load control output and the timer expires before satisfaction of the first request for the temperature change, the controller issues a second request for the temperature change at the load control output.

2. The thermostat of claim 1 wherein the timer, before it expires, is further responsive to the controller for resetting when the temperature sensor indicates a change in temperature consistent with the request for a temperature change.

3. The thermostat of claim 2 wherein the requested temperature changes are requests for heat, and the change in temperature consistent with the request for a temperature change is an increase in temperature.

4. The thermostat of claim 3, wherein the timer has a variable expiration period.

5. The thermostat of claim 3, wherein the timer has a predetermined expiration period.

6. The thermostat of claim 5, wherein the predetermined expiration period is about two hours.

7. The thermostat of claim 3, wherein the timer is configured to reset upon issuance of the second request for heat, and the controller is configured to issue a third request for heat at the load control output when the timer expires before satisfaction of the second request for heat.

8. The thermostat of claim 3, wherein the controller is configured to operate latching relays to control the environmental temperature control system, the latching relays comprise coils, and the controller is configured to provide a pulse to coils of the latching relays of longer duration for the second request for heat than for the first request for heat.

9. The thermostat of claim 3, wherein the timer is configured to reset repeatedly after each request for heat is issued, and the controller is configured to issue a request for heat each time the timer expires.

10. The thermostat of claim 3 configured to issue requests for heat after each expiration of a time period, and further comprising means for limiting a number of repetitions of heat requests without the thermostat being recycled or the temperature setting changed.

11. A thermostat for an environmental temperature control system having a temperature control load, the thermostat comprising:

a temperature sensor;

a timer;

a controller configured to issue requests for temperature changes to the temperature control load and responsive to the temperature sensor and the timer for cycling the temperature control load at or after the expiration of an interval set by the timer when a request for a temperature change issued by the controller is not satisfied during the interval.

12. The thermostat of claim 11 wherein the thermostat is configured to issue least requests for heat, and the requests for temperature changes are requests for heat.

13. The thermostat of claim 12 wherein the controller is responsive to the temperature sensor and the timer for cycling a temperature control load a plurality of times, each cycle taking place at an interval set by the timer, while the request for heat is not satisfied.

14. The thermostat of claim 12 wherein the controller comprises means for cycling a millivolt heating system.

15. The thermostat of claim 12 wherein the controller comprises means for cycling a heat pump system.

16. The thermostat of claim 12 wherein the controller is responsive to the timer and temperature sensor to recycle the temperature control load when an ambient temperature has not reached a set point within two hours after a call for heat by the controller.

17. The thermostat of claim 12 wherein the timer is configured to reset when each interval ends without the request for heat having been satisfied, and the controller is configured to issue requests for heat to the temperature load each time an interval ends without the request for heat having been satisfied.

18. The thermostat of claim 12 wherein the controller and timer are configured so that the controller repeatedly issues requests for heat spaced at intervals from one another as long as intervals end without the requests for heat having been satisfied, until a maximum repetition count has been reached.

19. A method of operating an environmental temperature control system including a temperature control load, the method comprising:

a first transient signal from a thermostat to operate the temperature control load to satisfy a thermostat setting, when the thermostat setting has not been satisfied after a period of time from the transmission of the first transient signal, transmitting a second transient signal from the thermostat to operate the temperature control load, which includes the transmission of a signal to cycle the temperature control load off and then on.

20. The method of claim 19, wherein the temperature control load is a millivolt heating system.

21. The method of claim 19 wherein the temperature control load is a heat pump.

22. A method of operating an environmental temperature control system including a temperature control load, the method comprising:

transmitting a first transient signal from a thermostat to operate the temperature control load to satisfy a thermostat setting;

when the thermostat setting has not been satisfied after about two hours from the transmission of the first transient signal transmitting a second transient signal from the thermostat to operate the temperature control load.

23. A method of operating an environmental temperature control system including a temperature control load, the method comprising:

transmitting a first transient signal from a thermostat to operate the temperature control load to satisfy a thermostat setting;

when the thermostat setting has not been satisfied after a period of time from the transmission of the first transient signal, transmitting repeatedly a second transient signal from the thermostat to operate the temperature control load, each repetition being separated by a predetermined period of time, until a maximum repetition count is reached, without satisfying the thermostat setting; and inhibiting automatic transmission of signals from the thermostat to control the temperature control load until the thermostat setting is changed, or the thermostat is recycled.

24. A method of operating an environmental temperature control system including a temperature control load, the method comprising:

transmitting a first transient signal from a thermostat to operate the temperature control load to satisfy a thermostat setting;

when the thermostat setting has not been satisfied after a period of time from the transmission of the first transient signal, transmitting a second transient signal from the thermostat to operate the temperature control load, the second transient signal being about twice as long as the first transient signal.

\* \* \* \* \*